United States Patent
Yamanaka et al.

(10) Patent No.: US 10,431,834 B2
(45) Date of Patent: Oct. 1, 2019

(54) FUEL CELL SYSTEM WITH IMPROVED VALVE CONTROL

(71) Applicant: TOYOTA JIDOSHA KABUSHIKI KAISHA, Toyota-shi, Aichi-ken (JP)

(72) Inventors: Tomio Yamanaka, Nagoya (JP); Tomotaka Ishikawa, Nagoya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 95 days.

(21) Appl. No.: 15/625,358

(22) Filed: Jun. 16, 2017

(65) Prior Publication Data
US 2018/0026288 A1    Jan. 25, 2018

(30) Foreign Application Priority Data
Jul. 21, 2016    (JP) .................... 2016-142885

(51) Int. Cl.
*H01M 8/06*    (2016.01)
*H01M 8/04537*    (2016.01)
(Continued)

(52) U.S. Cl.
CPC ... *H01M 8/04089* (2013.01); *H01M 8/04559* (2013.01); *H01M 8/04753* (2013.01); *H01M 2250/20* (2013.01); *Y02T 90/32* (2013.01)

(58) Field of Classification Search
CPC ......... H01M 8/04089; H01M 8/04753; H01M 8/04223; H01M 8/04225; H01M 8/04228;
(Continued)

(56) References Cited

U.S. PATENT DOCUMENTS

| 2003/0022037 A1* | 1/2003 | Parr .................. H01M 8/04223 429/429 |
| 2008/0008913 A1* | 1/2008 | Shimoi ............. H01M 8/04097 429/415 |

(Continued)

FOREIGN PATENT DOCUMENTS

| JP | 2010114039 A | 5/2010 |
| JP | 2015014331 A | 1/2015 |

(Continued)

*Primary Examiner* — Imran Akram
(74) *Attorney, Agent, or Firm* — Dickinson Wright, PLLC

(57) ABSTRACT

There is provided a fuel cell system comprising a controller configured to control an opening position of a valve element of a flow dividing valve. The valve element is configured to be movable between a first position and a second position, according to the number of steps of a stepping motor that is provided to drive the valve element. When causing a fuel cell to perform power generation, the controller moves the valve element by a first number of steps such as to move from the first position to the second position and to additionally move the valve element toward the second position, based on a second number of steps that are taken from a time when the valve element starts moving from the first position toward the second position to a time when a voltage measured by a voltage sensor exceeds a predetermined value. This configuration provides a just enough number of steps to correct the position of the valve element and move the valve element to a position where the valve element is pressed against a valve seat.

3 Claims, 5 Drawing Sheets

(51) Int. Cl.
H01M 8/04089 (2016.01)
H01M 8/04746 (2016.01)

(58) Field of Classification Search
CPC ............ H01M 8/04231; H01M 8/043; H01M 8/04544; H01M 8/04552; H01M 8/04559; H01M 8/04955; H01M 8/04992; H01M 8/06
See application file for complete search history.

(56) References Cited

U.S. PATENT DOCUMENTS

| | | | |
|---|---|---|---|
| 2008/0014476 A1* | 1/2008 | Kratschmar ...... | H01M 8/04089 429/429 |
| 2011/0171549 A1* | 7/2011 | Kato ................. | H01M 8/04552 429/429 |
| 2015/0008353 A1 | 1/2015 | Kiku | |
| 2015/0140365 A1* | 5/2015 | Shimada ........... | H01M 8/04089 429/9 |
| 2015/0188169 A1 | 7/2015 | Shimada | |
| 2016/0141684 A1 | 5/2016 | Yamanaka et al. | |
| 2016/0141905 A1* | 5/2016 | Yamanaka ............ | H02J 7/0065 320/135 |

FOREIGN PATENT DOCUMENTS

| | | |
|---|---|---|
| JP | 5822024 B2 | 11/2015 |
| JP | 2016096088 A | 5/2016 |

\* cited by examiner

FUEL CELL SYSTEM WITH IMPROVED VALVE CONTROL

CROSS-REFERENCE TO RELATED APPLICATIONS

The present application claims priority from Japanese patent application 2016-142885 filed on Jul. 21, 2016, the entirety of the content of which is hereby incorporated by reference into this application.

BACKGROUND

Field

The present disclosure relates to a fuel cell system.

Related Art

A known configuration of a fuel cell system includes a valve that is driven by a stepping motor and is configured to adjust the opening position of a flow path through which a reactive gas flows, according to the number of steps of the stepping motor.

For the purpose of correcting the position of a valve element that is likely to cause a step-out, a fuel cell system described in JP 5822024 moves the valve element toward a valve seat by a predetermined number of steps prior to a start of power generation by a fuel cell. When a large number of steps is set as the predetermined number of steps, however, this fuel cell system is likely to increase the number of steps by which the valve element is moved to be greater than the required number of steps to move the valve element to a position where the valve element is pressed against the valve seat. This results in increasing the time period required for the predetermined number of steps. When a small number of steps is set as the predetermined number of steps, on the other hand, this fuel cell system is likely to fail to move the valve element to the position where the valve element is pressed against the valve seat. In order to solve these problems, there is a demand for a technique that provides a just enough number of steps to correct the position of the valve element and move the valve to the position where the valve element is pressed against the valve seat.

SUMMARY

In order to solve at least part the problems described above, the disclosure may be implemented by aspects described below.

According to one aspect of the disclosure, there is provided a fuel cell system. This fuel cell system comprises a fuel cell configured to generate electric power using a reactive gas; a voltage sensor configured to measure a voltage output from the fuel cell; a compressor configured to compress the reactive gas and feed the compressed reactive gas; a first flow path connected with the compressor on one end thereof and configured to discharge the reactive gas compressed and fed by the compressor, to the atmosphere; a second flow path arranged to branch off from the first flow path and to be connected with the fuel cell and configured to feed the reactive gas compressed and fed by the compressor, to the fuel cell; a flow dividing valve placed at a branch position where the second flow path branches off from the first flow path and configured to include a valve element and to divide a flow of the reactive gas fed from the compressor and regulate a flow amount of the reactive gas toward a first side that is a downstream side of the branch position in the first flow path and a flow amount of the reactive gas toward a second side that is a second flow path side, wherein the valve element is configured to be movable between a first position that opens the first side and closes the second side and a second position that closes the first side and opens the second side, according to number of steps of a stepping motor that is provided to drive the valve element; and a controller configured to control an opening position of the valve element of the flow dividing valve, based on the voltage measured by the voltage sensor. When causing the fuel cell not to perform power generation, the controller places the valve element at the first position. When causing the fuel cell to perform power generation, the controller moves the valve element by a first number of steps such as to move from the first position to the second position and additionally moves the valve element toward the second position, based on a second number of steps that are taken from a time when the valve element starts moving from the first position toward the second position to a time when the voltage measured by the voltage sensor exceeds a predetermined value. In the fuel cell system of this aspect, it is assumed that the second side is closed to stop the supply of the reactive gas to the fuel cell until the voltage of the fuel cell exceeds the predetermined value (i.e., the value used to determine that the fuel cell starts power generation). It is thus assumed that the valve element is not moved toward the second position by the second number of steps out of the first number of steps. Accordingly the fuel cell system of this aspect additionally moves the valve element toward the second position by the second number of steps in addition to the first number of steps and thereby enables the valve element to be moved to the position where the valve element is pressed against a valve seat (i.e., the second position). This configuration accordingly provides the just enough number of steps to correct the position of the valve element and move the valve element to the position where the valve element is pressed against the valve seat.

DESCRIPTION OF EMBODIMENTS

A. First Embodiment

Figure 1:
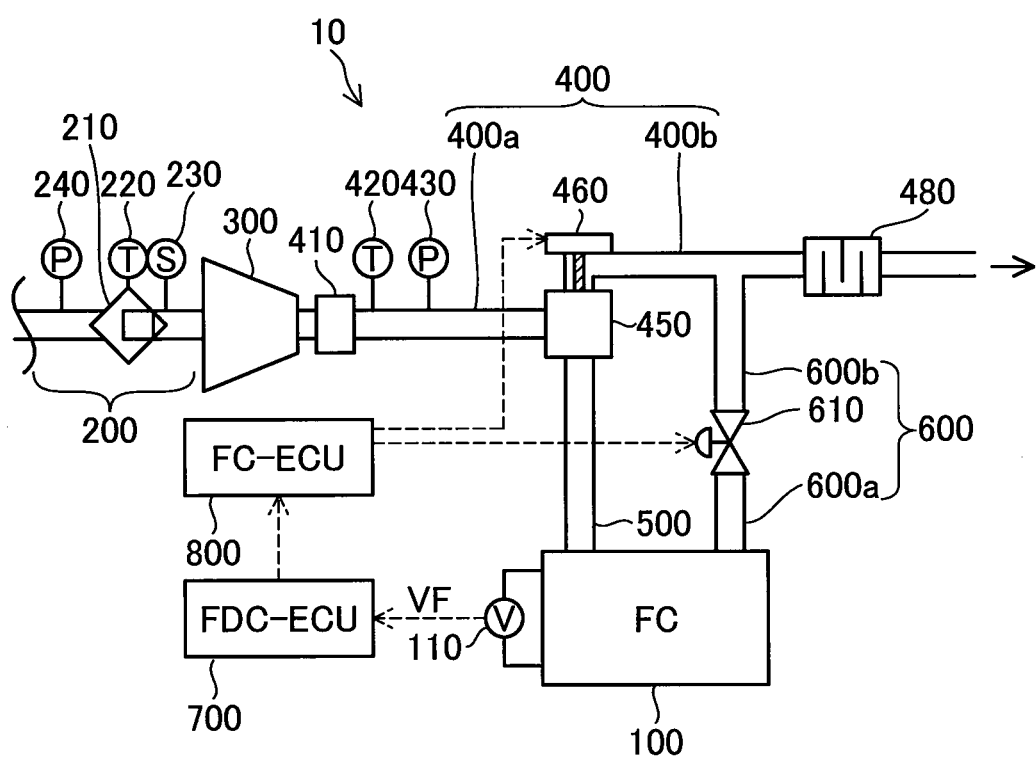
FIG. 1 is a diagram illustrating the configuration of a fuel cell system according to one embodiment.

FIG. 1 is a diagram illustrating the configuration of a fuel cell system 10 according to one embodiment of the disclosure. The fuel cell system 10 is mounted as the power source of a vehicle that is driven with a motor. The fuel cell system 10 is configured to include a fuel cell 100, an air intake flow path 200, a compressor 300, a first flow path 400, a flow dividing valve 450, a second flow path 500, a third flow path 600, an FDC-ECU 700 and an FC-ECU 800.

The fuel cell 100 has a stack structure by stacking a plurality of unit cells. Each unit cells is configured such that a membrane electrode assembly provided by forming an anode and a cathode on respective surfaces of an electrolyte membrane having proton conductivity is placed between separators. The fuel cell 100 is configured to receive supplies of hydrogen gas and the air and generate electric power by an electrochemical reaction of hydrogen and oxygen.

The fuel cell 100 is equipped with a voltage sensor 110. The voltage sensor 110 is a sensor configured to detect an output voltage VF of the fuel cell 100. The voltage sensor 110 is configured to output a signal indicating the detected output voltage VF of the fuel cell 100 to the FDC-ECU 700.

The air intake flow path 200 has one end connected with the compressor 300. The air intake flow path 200 is a flow passage arranged to feed the air from the atmosphere to the compressor 300. The air intake flow path 200 is provided with an air cleaner 210, an ambient temperature sensor 220, an air flowmeter 230 and an atmospheric pressure sensor 240.

The air cleaner 210 is configured to remove the dust and dirt from the air while the air flows in the air intake flow path 200. The ambient temperature sensor 220 is configured to obtain the temperature of the air taken in from the atmosphere. The air flowmeter 230 is configured to measure the flow rate of the air taken in from the atmosphere. The atmospheric pressure sensor 240 is configured to measure the atmospheric pressure.

The compressor 300 is configured to compress the air taken in from the atmosphere and feed the compressed air to the first flow path 400. More specifically, the compressor 300 is configured to feed the compressed air through a first upstream flow path 400a and the second flow path 500 to the fuel cell 100.

The first flow path 400 is a flow passage that is connected with the compressor 300 at one end thereof and is configured to discharge the air fed from the compressor 300, to the atmosphere. The first flow path 400 includes the first upstream flow path 400a and a first downstream flow path 400b. The first upstream flow path 400a is a portion of the first flow path 400 that has one end connected with the compressor 300 and has the other end connected with the flow dividing valve 450. The first downstream flow path 400b is a portion of the first flow path 400 that has one end connected with the flow dividing valve 450 and is configured to discharge the air fed from the compressor 300, to the atmosphere.

The first flow path 400 is provided with an intercooler 410, a temperature sensor 420, a pressure sensor 430 and a muffler 480.

The intercooler 410 is configured to cool down the air compressed by the compressor 300. The temperature sensor 420 is configured to detect the temperature of the air fed from the compressor 300.

The pressure sensor 430 is placed on the downstream side of the compressor 300 and on the upstream side of the flow dividing valve 450 in the air flow direction. The pressure sensor 430 is configured to measure the pressure of the air compressed by the compressor 300.

The muffler 480 is placed on the downstream side of a connecting position where the third flow path 600 is connected with the first downstream flow path 400b. The muffler 480 is configured to reduce the exhaust sound generated in the process of discharging the air to the atmosphere.

The flow dividing valve 450 is placed at a branch position where the second flow path 500 branches off from the first flow path 400. The flow dividing valve 450 is configured to divide the air compressed and fed by the compressor 300 and regulate the flow amount of the air toward the first downstream flow path 400b and the flow amount of the air from the branch position toward the second flow path 500.

The second flow path 500 is a flow passage that is branched off from the first flow path 400 via the flow dividing valve 450, is connected with the fuel cell 100 and is configured to feed the air fed from the compressor 300, to the fuel cell 100.

The third flow path 600 has one end connected with the fuel cell 100 and the other end connected with the first downstream flow path 400b. The third flow path 600 is a flow passage configured to feed the air, as the exhaust gas from the fuel cell 100, to the first downstream flow path 400b. The third flow path 600 includes a third upstream flow path 600a, a pressure regulator 610 and a third downstream flow path 600b.

The third upstream flow path 600a is a portion of the third flow path 600 that is connected with the fuel cell 100 on the upstream side thereof. The third upstream flow path 600a is connected with the third downstream flow path 600b via the pressure regulator 610 on the downstream side thereof. The third downstream flow path 600b is a portion of the third flow path 600 that is connected with the first downstream flow path 400b on the downstream side thereof.

The pressure regulator 610 is placed between the third upstream flow path 600a and the third downstream flow path 600b in the third flow path 600. The pressure regulator 610 is configured to open and close the third flow path 600. The pressure regulator 610 is an electromagnetically-driven pressure regulator configured to regulate the amount of the exhaust gas that is flowed from the fuel cell 100 to the first flow path 400.

The FDC-ECU 700 is a high voltage unit controller configured to control the operations of a fuel cell converter (not shown). The FDC-ECU 700 is configured to receive a signal indicating the output voltage VF of the fuel cell 100 from the voltage sensor 110. The FDC-ECU 700 is also configured to output a signal indicating the received output voltage VF to the FC-ECU 800.

The FC-ECU 800 is a controller configured to receive signals output from various sensors provided in the fuel cell system 10 and to control the operations of the respective components (including the flow dividing valve 450 and the pressure regulator 610) of the fuel cell system 10. The FC-ECU 800 is configured by a microcomputer including a CPU, a RAM and a ROM. The FC-ECU 800 is configured to control the opening position of a valve element 464 in the flow dividing valve 450 using the output voltage VF of the fuel cell 100 measured by the voltage sensor 110.

Figure 2:
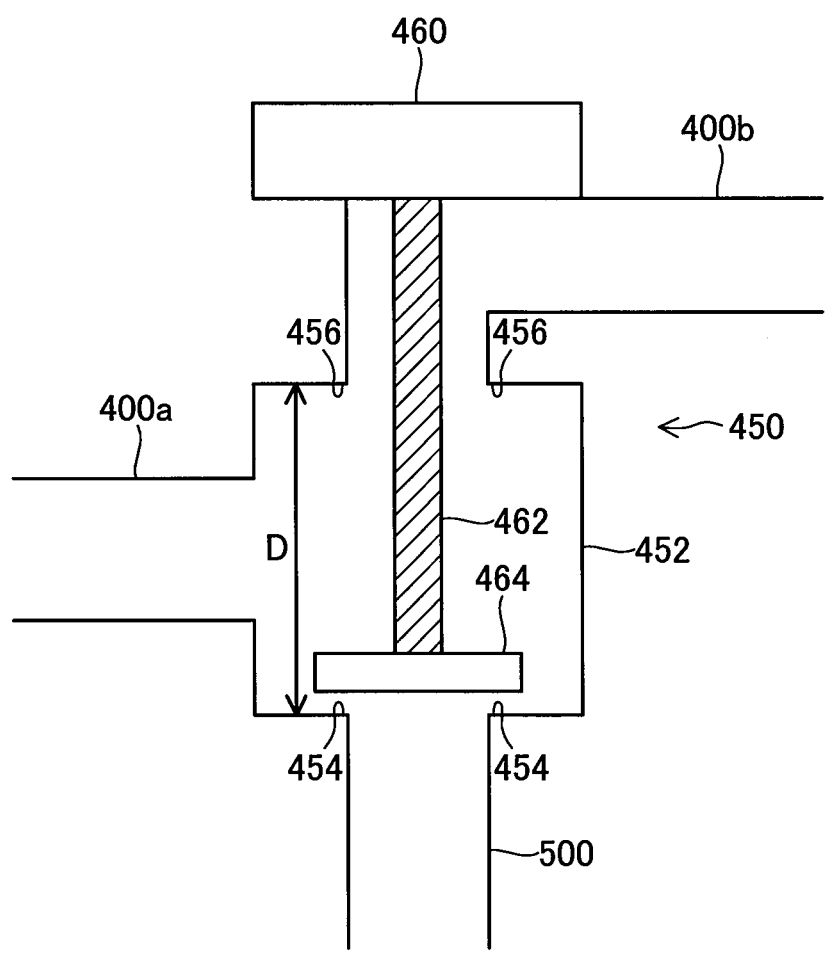
FIG. 2 is a diagram illustrating the detailed configuration of a flow dividing valve.

FIG. 2 is a diagram illustrating the detailed configuration of the flow dividing valve 450. The flow dividing vale 450 is configured to include a valve box 452, a stepping motor 460, a valve rod 462 and the valve element 464. The valve box 452 is a box-like member that is provided at a connecting position of the first upstream flow path 400a, the first downstream flow path 400b and the second flow path 500 and is configured to place the valve rod 462 and the valve element 464 therein.

The valve box 452 is configured to include a first valve seat 454 and a second valve seat 456. The first valve seat 454 is a portion provided to surround an opening at a connecting position of the valve box 452 and the second flow path 500. The second valve seat 456 is a portion provided to surround an opening at a connecting position of the valve box 452 and the first downstream flow path 400b.

The stepping motor 460 is configured to generate a torque of rotating the valve rod 462. The valve element 464 is placed on an opposite end of the valve rod 462 that is opposite to an end connected with the stepping motor 460. The position of the valve element 464 is adjusted according to the number of steps of the stepping motor 460.

The valve element 464 is a disk-shaped member. The valve element 464 is configured to have a larger sectional area than the area of the opening at the connecting position of the valve box 452 and the second flow path 500 and the area of the opening at the connecting position of the valve box 452 and the first downstream flow path 400b. The position of the valve element 464 is adjusted by the stepping motor 460 in a range D from a position where the valve element 464 is pressed against the first valve seat 454 to a position where the valve element 464 is pressed against the second valve seat 456.

When the valve element 464 is pressed against the first valve seat 454, the valve element 464 serves to close the second flow path 500 and open the first downstream flow path 400b. According to this embodiment, this position of the valve element 464 is called "first position". When the valve element 464 is pressed against the second valve seat 456, on the other hand, the valve element 464 serves to open the second flow path 500 and close the first downstream flow path 400b. According to this embodiment, this position of the valve element 464 is called "second position".

The valve element 464 is movable between the first position and the second position according to the number of steps of the stepping motor 460. According to this embodiment, the valve element 464 has the larger opening position when the valve element 464 is placed nearer to the second position.

When causing the fuel cell 100 not to perform power generation, the FC-ECU 800 places the valve element 464 at the first position and closes the pressure regulator 610. When causing the fuel cell 100 to perform power generation, on the other hand, the FC-ECU 800 opens the pressure regulator 610 and subsequently moves the valve element 464 by a first number of steps such as to move from the first position to the second position. The FC-ECU 800 additionally moves the valve element 464 toward the second position by a second number of steps that are taken from the time when the valve element 464 is started to move from the first position toward the second position to the time when the output voltage VF of the fuel cell 100 measured by the voltage sensor 110 exceeds a predetermined voltage V1, in addition to the first number of steps. The following describes the reason why the FC-ECU 800 performs such control to cause the fuel cell 100 to perform power generation.

Figure 3:
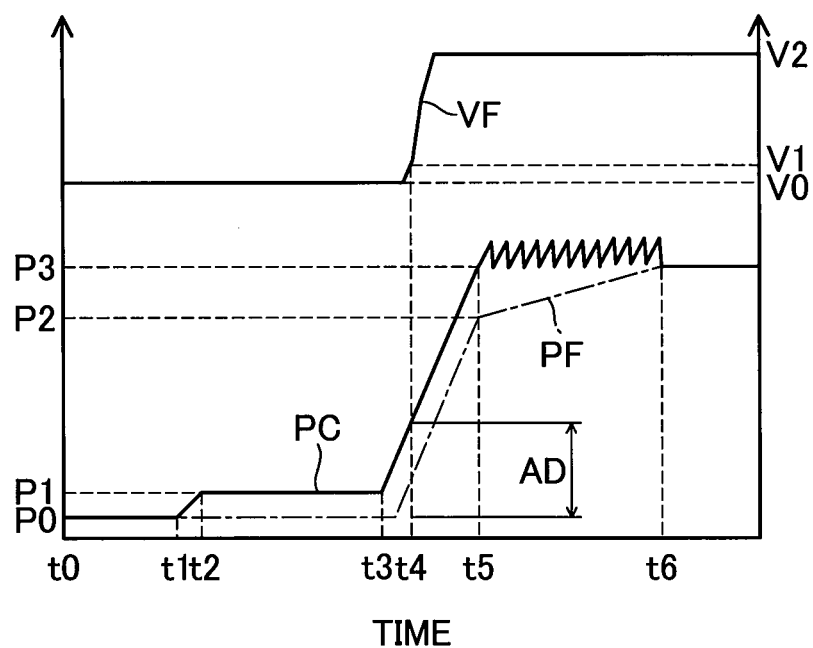
FIG. 3 is a diagram illustrating a relationship between power generation by a fuel cell and change in position of a valve element.

FIG. 3 is a diagram illustrating a relationship between power generation of the fuel cell 100 and change in position of the valve element 464. A solid line curve VF in the graph of FIG. 3 shows a variation in the output voltage VF of the fuel cell 100 measured by the voltage sensor 110. A solid line curve PC in the graph of FIG. 3 shows a variation in the opening position of the valve element 464 presumed by the FC-ECU 800. A one-dot chain line curve PF in the graph of FIG. 3 shows a variation in the actual opening position of the valve element 464.

The graph of FIG. 3 shows the time as abscissa. The graph of FIG. 3 shows the voltage as ordinate with regard to the solid line curve VF. The graph of FIG. 3 shows the opening position of the valve element 464 as ordinate with regard to the solid line curve PC and the one-dot chain line curve PF.

During a time period from a timing t0 to a timing t1, the opening position of the valve element 464 is an opening position P0 indicating that the valve element 464 is at the first position. In this state, the valve element 464 is placed to close the second flow path 500 and open the first downstream flow path 400b. In this state, the pressure regulator 610 is also closed. This configuration does not feed the air to the fuel cell 100 and accordingly does not enable the fuel cell 100 to perform power generation. Accordingly the voltage output from the fuel cell 100 is not changed but is kept at V0 (=0).

At the timing t1, the FC-ECU 800 opens the pressure regulator 610 and subsequently gives an instruction to the valve element 464 to move by a specified number of steps such as to change the opening position of the valve element 465 to an opening position P1. At a timing t2, the FC-ECU 800 presumes that the opening position of the valve element 464 is the opening position P1.

At the timing t2, however, the actual opening position of the valve element 464 is kept at P0. There is accordingly a step-out. This is attributed to the possibility that the valve element 464 fails to separate from the first valve seat 454 and move toward the second position at the beginning of the specified number of steps. Such possibility arises, for example, (1) the case where the valve element 464 fails to separate from the first valve seat 454 and the opening position of the valve element 464 fails to change from the opening position P0 to the opening position P1, due to sticking of a rubber seal member that is provided on one of the first valve seat 454 and a surface of the valve element 464 that is in contact with the first valve seat 454 for the purpose of enhancing the sealing property; or (2) the case where the valve element 464 fails to separate from the first valve seat 454 and the opening position of the valve element 464 fails to change from the opening position P0 to the opening position P1, due to a pressure difference between the valve box 452 and the second flow path 500 across the valve element 464 at the first position as the boundary.

According to the embodiment, the FC-ECU 800 opens the pressure regulator 610 and subsequently gives an instruction to the valve element 464 to move by a specified number of steps such as to change the opening position of the valve element 464 to the opening position P1. This configuration prevents the valve element 464 from failing to move from the first position due to the reason (2) described above. It is thus assumed that the step-out shown in FIG. 3 is attributed to the reason (1) described above.

At a timing t3, the FC-ECU 800 gives an instruction to the valve element 464 to move by a specified number of steps such as to change the opening position of the valve element 464 from the opening position P1 to an opening position P3 indicting that the valve element 464 is at the second position. At a timing t5, the FC-ECU 800 presumes that the opening position of the valve element 464 is the opening position P3.

At the timing t5, however, the actual opening position of the valve element 464 is an opening position P2 (that is smaller than the opening position P3). As described above, the FC-ECU 800 gives the instruction to the valve element 464 to move by the specified number of steps such as to change the opening position of the valve element 464 from the opening position P1 to the opening position P3 indicating that the valve element 464 is at the second position. In response to this instruction, the valve element 464 takes off the sticking of the rubber seal member and moves toward the second position. Some number of steps are, however, required for taking off the sticking of the rubber seal member, so that the actual opening position of the valve element 464 at the timing t5 is the opening position P2 that is smaller than the opening position P3.

The total number of steps specified by the FC-ECU 800 to change the opening position of the valve element 464 from the opening position P0 to the opening position P3 (i.e., to move the valve element 464 from the first position to the second position) is called first number of steps. The first number of steps herein denotes the number of steps that are taken to move the valve element 464 from the first position to the second position in the state that the valve element 464 is movable toward the second position without requiring some number of steps to separate the valve element 464 from the first valve seat 454. In the case where some number of steps are required to separate the valve element 464 from the first valve seat 454, the valve element 464 fails to reach the second position from the first position irrespective of the instruction given by the FC-ECU 800 to the valve element 464 to move by the number of first steps. For example, the opening position P2 of the one-dot chain line curve PF at the timing t5 shows such a case.

After the valve element 464 actually starts separating from the first valve seat 454, the output voltage VF of the fuel cell 100 measured by the voltage sensor 110 increases to a voltage V1 at a timing t4. The voltage V1 is a voltage value used to determine that the fuel cell 100 starts power generation. According to this embodiment, the voltage value set as the voltage V1 is a lower limit value of an operating voltage range used in the vehicle equipped with the fuel cell system 10 after power generation of the fuel cell 100 reaches the steady state. According to another embodiment, the voltage value set as the voltage V1 may be a voltage value that is one tenth of a voltage V2 when power generation of the fuel cell 100 reaches the steady state.

The number of steps that are taken from the time when the FC-ECU 800 causes the valve element 464 to start moving from the first position toward the second position to the time when the voltage of the fuel cell 100 measured by the voltage sensor 110 exceeds the voltage V1 is called second number of steps AD. The second number of steps AD is calculated by the FC-ECU 800, based on the output timing of a signal indicating that the output voltage VF of the fuel cell 100 output from the voltage sensor 110 is the voltage V1. According to this embodiment, the FC-ECU 800 calculates the second number of steps AD by taking into account a time lag arising when the FC-ECU 800 receives the signal from the voltage sensor 110 (conversion log into a digital signal in the voltage sensor 110 and a time lag from the output of the signal from the voltage sensor 110 to the reception of the signal by the FC-ECU 800 via the FDC-ECU 700).

At the timing t5, the FC-ECU 800 gives an instruction to the valve element 464 to additionally move toward the second position by the second number of steps AD. At this moment, the FC-ECU 800 presumes that the opening position of the valve element 464 is the opening position P3 and thereby conceives that the valve element 464 is pressed against the second valve seat 456 multiple times during a time period from the timing t5 to a timing t6. At the timing t6, the FC-ECU 800 presumes that the opening position of the valve element 464 is the opening position P3.

At the timing t5, however, the actual opening position of the valve element 464 is the opening position P2. The valve element 464 accordingly moves toward the second position by the second number of steps AD during the time period from the timing t5 to the timing t6. At the timing t6, the actual opening position of the valve element 464 is the opening position P3.

The second number of steps AD is the number of steps that are taken from the time when the valve element 464 is started to move from the first position toward the second position to the time when the output voltage VF of the fuel cell 100 measured by the voltage sensor 110 exceeds the predetermined voltage V1, out of the first number of steps. The voltage V1 is the voltage value used to determine that the fuel cell 100 starts power generation. It is thus assumed that the valve element 464 is placed to close the second flow path 500 and thereby stop the supply of the air to the fuel cell 100 during the time period from the time when the valve 464 starts moving to the time when the output voltage VF exceeds the voltage V1. It is accordingly assumed that the valve element 464 is not moved toward the second position by the second number of steps AD out of the first number of steps.

The configuration of additionally moving the valve element 464 toward the second position by the second number of steps AD in addition to the first number of steps thus enables the valve element 464 to be moved to the position where the valve element 464 is pressed against the second valve seat 456 (i.e., the second position). In the graph of FIG. 3, the variation of the one-dot chain line curve PF from the opening position P2 to the opening position P3 during the time period between the timing t5 and the timing t6 indicates the state that the valve element 464 additionally moves. This configuration of the fuel cell system 100 accordingly enables the opening position of the valve element 464 presumed by the FC-ECU 800 to be consistent with the actual opening position of the valve element 464 at the second position.

Figure 4:
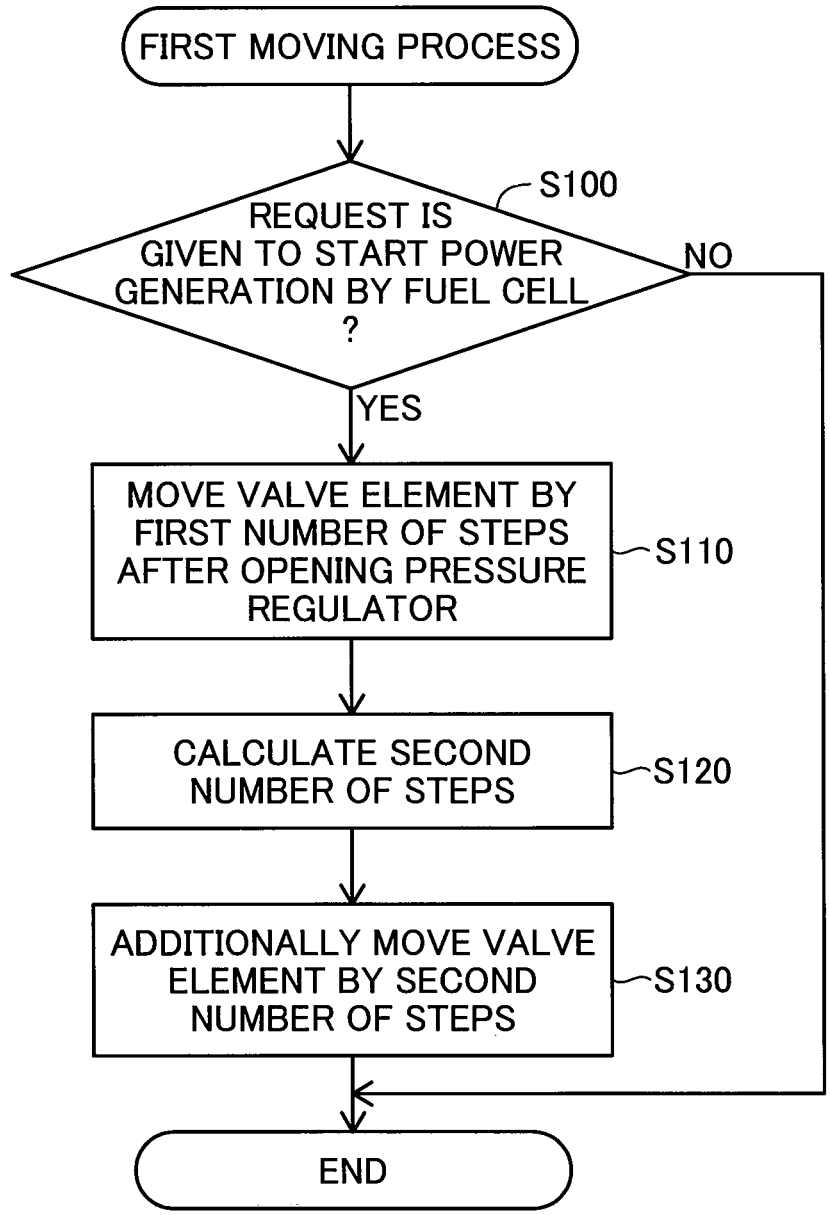
FIG. 4 is a flowchart showing a first moving process performed by a fuel cell system.

FIG. 4 is a flowchart showing a first moving process performed by the fuel cell system 10. The fuel cell system 10 performs the first moving process at regular intervals, while the fuel cell system 10 is operated but the fuel cell 100 does not perform power generation. The state that the fuel cell 100 does not perform power generation herein means the state that the valve element 464 is placed at the first position and the pressure regulator 610 is closed, so that the air is not fed to the fuel cell 100.

When the first moving process is triggered, the FC-ECU 800 first determines whether a request is given to start power generation by the fuel cell 100 (step S100). When no such a request is given (step S100: NO), the first moving process of FIG. 4 is terminated.

When such a request is given (step S100: YES), on the other hand, the FC-ECU 800 opens the pressure regulator 610 and subsequently moves the valve element 464 by the first number of steps (step S110). While the valve element 464 is moved by the first number of steps, the valve 464 starts separating from the first valve seat 454, so that the output voltage VF measured by the voltage sensor 110 exceeds the voltage V1. The FC-ECU 800 subsequently calculates the second number of steps AD, based on the output timing of the signal indicating that the output voltage VF of the fuel cell 100 output from the voltage sensor 110 is the voltage V1 (step S120).

After calculating the second number of steps AD (step S120), the FC-ECU 800 additionally moves the valve element 464 by the calculated second number of steps AD (step S130). The first moving process of FIG. 4 is then terminated.

According to the embodiment described above, it is assumed that the second flow path 500 is closed to stop the supply of the air to the fuel cell 100 until the voltage of the fuel cell 100 exceeds a predetermined value (i.e., the value used to determine that the fuel cell 100 starts power generation). It is thus assumed that the valve element 464 is not moved toward the second position by the second number of steps AD out of the first number of steps. Accordingly the configuration of the embodiment additionally moves the valve element 464 toward the second position by the second number of steps AD in addition to the first number of steps and thereby enables the valve element 464 to be moved to the position where the valve element 464 is pressed against the second valve seat 456 (i.e., the second position). This configuration accordingly provides the just enough number of steps to correct the position of the valve element 464 and move the valve element 464 to the position where the valve element 464 is pressed against the second valve seat 456.

According to the embodiment described above, the FC-ECU 800 opens the pressure regulator 610 and subsequently moves the valve element 464 by the first number of steps, when causing the fuel cell 100 to start power generation. This configuration causes the valve element 464 to start moving from the first position toward the second position after opening the pressure regulator 610. This configuration accordingly prevents the valve element 464 from failing to move from the first position when the internal pressure of the fuel cell 100 is a negative pressure at a start of power generation by the fuel cell 100.

The state that the internal pressure of the fuel cell 100 is a negative pressure at a start of power generation by the fuel cell 100 arises, for example, in the case where the condition of the fuel cell 100 is changed from the state of power generation to the state of no power generation (i.e., the state of no supply of the air to the fuel cell 100) and production of water by the reaction of oxygen in the air and hydrogen remaining in the fuel cell 100 decreases the internal pressure of the fuel cell 100 to be lower than the pressure on the side of the first flow path 400 (including the third upstream flow path 600a).

B. Second Embodiment

Figure 5:
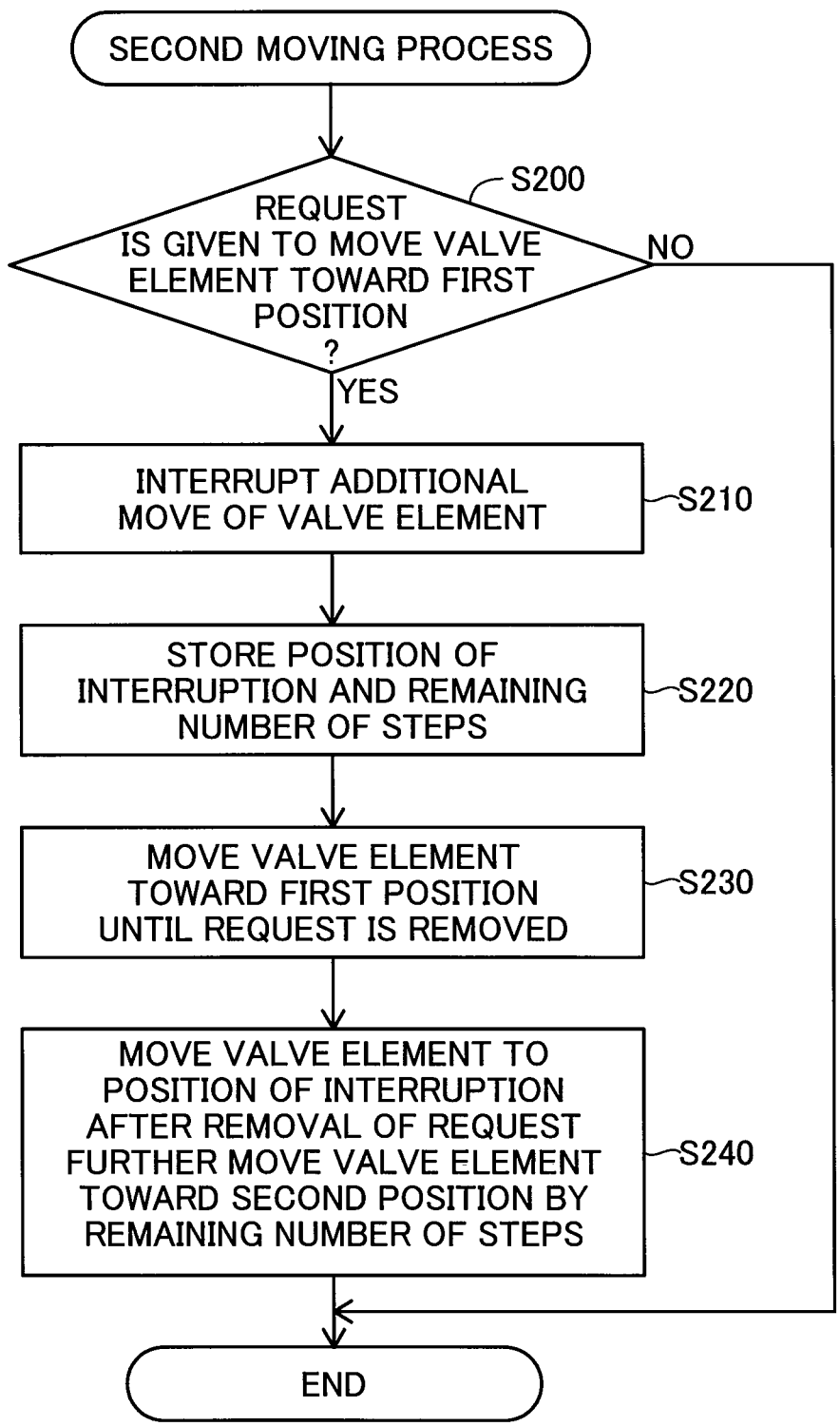
FIG. 5 is a flowchart showing a second moving process performed by a fuel cell system according to a second embodiment.

FIG. 5 is a flowchart showing a second moving process performed by a fuel cell system 10a according to a second embodiment. The fuel cell system 10a has similar configuration and similar functions to those of the fuel cell system 10 of the first embodiment, except that the fuel cell system 10a performs the second moving process, in addition to the first moving process performed by the fuel cell system 10 of the first embodiment.

The fuel cell system 10a performs the second moving process at regular intervals, while the valve element 464 additionally moves toward the second position by the second number of steps AD.

When the second moving process is triggered, the FC-ECU 800 first determines whether a request is given to move the valve element 464 toward the first position (step S200). When no such a request is given (step S200: NO), the second moving process of FIG. 5 is terminated. The request for moving the valve element 464 toward the first position during the additional move of the valve element 464 may be, for example, a flow dividing request that causes the valve element 464 to open both the second flow path 500 and the first downstream flow path 400b, i.e., that divides the air compressed and fed by the compressor 300 into the flows of the second flow path 500 and the first downstream flow path 400b. In such a case, the valve element 464 is to be moved to the position between the first position and the second position.

When such a request is given (step S200: YES), on the other hand, the FC-ECU 800 interrupts the additional move of the valve element 464 (step S210). After interrupting the additional move of the valve element 464, the FC-ECU 800 stores the position of interruption where the additional move of the valve element 464 is interrupted and the remaining number of steps, by which the valve element 464 is not moved, out of the second number of steps AD (step S220). The position of interruption where the additional move of the valve element 464 is interrupted herein means the position of the valve element 464 corresponding to an integrated value of the number of steps, which is specified by the FC-ECU 800 to move the valve element 464 from the first position toward the second position, between the first position and the position of interruption.

After storing the position of interruption and the remaining number of steps, the FC-ECU 80 moves the valve element 464 toward the first position until the request for moving the valve element 464 toward the first position is removed (step S230).

After removal of the request for moving the valve element 464 toward the first position, the FC-ECU 800 moves the valve element 464 to the position of interruption and subsequently moves the valve element 464 toward the second position by the remaining number of steps, by which the valve element 464 is not moved, out of the second number of steps AD (step S240). The second moving process of FIG. 5 is then terminated.

The expression of "after removal of the request for moving the valve element 464 toward the first position" does not strictly mean simultaneously with removal of the request for moving the valve element 464 toward the first position but includes the case where the valve element 464 stays at a position where the valve element 464 reaches by the request for a certain time period after removal of the request for moving the valve element 464 toward the first position. The latter case may be, for example, the case where the valve element 464 moved to the position between the first position and the second position as a result of the flow dividing request stays at the position for a certain time period.

The configuration of the second embodiment stores the remaining number of steps from the position of interruption. Even when the additional move of the valve element 464 is interrupted, this configuration enables the valve element 464 to be moved from the position of interruption toward the second position without recalculating the number of steps. This configuration also prevents the number of steps for the additional move from unnecessarily increasing, compared with a configuration that additionally moves the valve element 464 by the second number of steps AD again from the position of interruption after interruption of the additional move. This configuration accordingly prevents the valve element 464 from being unnecessarily pressed against the second valve seat 456 by the unnecessarily increasing number of steps.

C. Modifications

According to the first embodiment described above, the compressor 300 is the compressor configured to feed the air (air compressor). The prevent disclosure is, however, not limited to this configuration. For example, the compressor 300 may be a compressor configured to feed a gas containing oxygen.

According to the first embodiment described above, the FC-ECU 800 opens the pressure regulator 610 and subsequently moves the valve element 464 by the first number of steps, when causing the fuel cell 100 to start power generation. The present disclosure is, however, not limited to this configuration. For example, according to a modification, the FC-ECU 800 may move the valve element 464 by the first number of steps without opening the pressure regulator 610, when causing the fuel cell 100 to start power generation. In this modified configuration, it is preferable that the stepping motor 460 provides a large torque such as to enable the valve element 464 to separate from the first valve seat 454 and move toward the second position from the beginning of the specified number of steps.

According to the first embodiment described above, the FC-ECU 800 causes the valve element 464 to additionally move toward the second position by the second number of steps AD. The present disclosure is, however, not limited to this configuration. For example, according to a modification, the FC-ECU 800 may additionally move the valve element 464 toward the second position by an increased number of steps that is increased from the second number of steps AD by a predetermined rate. According to another modification, the FC-ECU 800 may additionally move the valve element 464 toward the second position by a decreased number of steps that is decreased from the second number of steps AD by a predetermined rate.

The disclosure is not limited to any of the embodiments, the examples, and the modifications described above but may be implemented by a diversity of other configurations without departing from the scope of the disclosure. For example, the technical features of any of the embodiments, the examples and the modifications may be replaced or combined appropriately, in order to solve part or all of the problems described above or in order to achieve part or all of the advantageous effects described above. Any of the technical features may be omitted appropriately unless the technical feature is described as essential herein. The present disclosure may be implemented by aspects described below.

(1) According to one aspect of the disclosure, there is provided a fuel cell system. This fuel cell system comprises a fuel cell configured to generate electric power using a reactive gas; a voltage sensor configured to measure a voltage output from the fuel cell; a compressor configured to compress the reactive gas and feed the compressed reactive gas; a first flow path connected with the compressor on one end thereof and configured to discharge the reactive gas compressed and fed by the compressor, to the atmosphere; a second flow path arranged to branch off from the first flow path and to be connected with the fuel cell and configured to feed the reactive gas compressed and fed by the compressor, to the fuel cell; a flow dividing valve placed at a branch position where the second flow path branches off from the first flow path and configured to include a value element and to divide a flow of the reactive gas fed from the compressor and regulate a flow amount of the reactive gas toward a first side that is a downstream side of the branch position in the first flow path and a flow amount of the reactive gas toward a second side that is a second flow path side, wherein the valve element is configured to be movable between a first position that opens the first side and closes the second side and a second position that closes the first side and opens the second side, according to number of steps of a stepping motor that is provided to drive the valve element; and a controller configured to control an opening position of the valve element of the flow dividing valve, based on the voltage measured by the voltage sensor. When causing the fuel cell not to perform power generation, the controller places the valve element at the first position. When causing the fuel cell to perform power generation, the controller moves the valve element by a first number of steps such as to move from the first position to the second position and additionally moves the valve element toward the second position, based on a second number of steps that are taken from a time when the valve element starts moving from the first position toward the second position to a time when the voltage measured by the voltage sensor exceeds a predetermined value. In the fuel cell system of this aspect, it is assumed that the second side is closed to stop the supply of the reactive gas to the fuel cell until the voltage of the fuel cell exceeds the predetermined value (i.e., the value used to determine that the fuel cell starts power generation). It is thus assumed that the valve element is not moved toward the second position by the second number of steps out of the first number of steps. Accordingly the fuel cell system of this aspect additionally moves the valve element toward the second position by the second number of steps in addition to the first number of steps and thereby enables the valve element to be moved to the position where the valve element is pressed against a valve seat (i.e., the second position). This configuration accordingly provides the just enough number of steps to correct the position of the valve element and move the valve element to the position where the valve element is pressed against the valve seat.

(2) The fuel cell system of the above aspect may further comprise a third flow path connected with the fuel cell on one end thereof and connected with the first side of the first flow path on the other end thereof and configured to feed an exhaust gas from the fuel cell, to the first flow path. The third flow path may be provided with a pressure regulator configured to open and close the third flow path, and the controller may be further configured to control the pressure regulator. When causing the fuel cell not to perform power generation, the controller may place the valve element at the first position and close the pressure regulator. When causing the fuel cell to perform power generation, the controller may open the pressure regulator, subsequently move the valve element by the first number of steps and additionally move the valve element toward the second position, based on the second number of steps. The fuel cell system of this aspect opens the pressure regulator and subsequently causes the valve element to start moving from the first position toward the second position. This configuration prevents the valve element from failing to move from the first position when the internal pressure of the fuel cell is a negative pressure at a start of power generation by the fuel cell.

(3) In the fuel cell system of the above aspect, when a request is given to move the valve element toward the first position during additional move of the valve element toward the second position, the controller may interrupt the additional move, store a position of interruption of the valve element where the additional move of the valve element is interrupted and a remaining number of steps, by which the valve element is not moved, out of the second number of steps, and subsequently move the valve element toward the first position. When the request is removed, the controller may move the valve element to the position of interruption and further move the valve element toward the second position by the remaining number of steps. The fuel cell system of this aspect stores the remaining number of steps from the position of interruption. Even when the additional move of the valve element is interrupted, this configuration enables the valve element to be moved from the position of interruption toward the second position without recalculating the number of steps. This configuration also prevents the number of steps for the additional move from unnecessarily increasing, compared with a configuration that additionally moves the valve element by the second number of steps again from the position of interruption after interruption of the additional move. This configuration accordingly prevents the valve element from being unnecessarily pressed at the second position by the unnecessarily increasing number of steps.

The present disclosure is not limited to the aspects of the fuel cell system described above but may be implemented by any of various other aspects, for example, a fuel cell system mounted on a vehicle or a marine vessel that is driven with electric power as the power source, such a vehicle or such a marine vehicle. The present disclosure may also be implemented by a computer program configured to implement such a fuel cell system, such a vehicle or such a marine vehicle. The present disclosure is not limited to any of the aspects described above but may be implemented by a diversity of other aspects without departing from the scope of the disclosure.

What is claimed is:

1. A fuel cell system, comprising:
a fuel cell configured to generate electric power using a reactive gas;
a voltage sensor configured to measure a voltage output from the fuel cell;
a compressor configured to compress the reactive gas and feed the compressed reactive gas;
a first flow path connected with the compressor on one end thereof and configured to discharge the reactive gas compressed and fed by the compressor, to the atmosphere;
a second flow path arranged to branch off from the first flow path and to be connected with the fuel cell and configured to feed the reactive gas compressed and fed by the compressor, to the fuel cell;
a flow dividing valve placed at a branch position where the second flow path branches off from the first flow path and configured to include a valve element and to divide a flow of the reactive gas fed from the compressor and regulate a flow amount of the reactive gas toward a first side that is a downstream side of the branch position in the first flow path and a flow amount of the reactive gas toward a second side that is a second flow path side,
wherein the valve element is configured to be movable between a first position that opens the first side and closes the second side and a second position that closes the first side and opens the second side, according to number of steps of a stepping motor that is provided to drive the valve element; and
a controller programmed to control the stepping motor to adjust an opening position of the valve element of the flow dividing valve, based on the voltage measured by the voltage sensor, wherein
when causing the fuel cell not to perform power generation, the controller is programmed to control the stepping motor to places the valve element at the first position, and
when causing the fuel cell to perform power generation, the controller is programmed to control the stepping motor to move the valve element by a total number of steps which is a sum of a first number of steps required for the valve element to actually move from the first position to the second position after separating from a first valve seat at the first position, and a second number of steps that are determined based on a time starting when the controller begins attempting to move the valve element from the first position toward the second position to a time when the voltage measured by the voltage sensor exceeds a predetermined value.

2. The fuel cell system according to claim 1, further comprising:
a third flow path connected with the fuel cell on one end thereof and connected with the first side of the first flow path on the other end thereof and configured to feed an exhaust gas from the fuel cell, to the first flow path, wherein
the third flow path is provided with a pressure regulator configured to open and close the third flow path, and
the controller is further programmed to control the pressure regulator, wherein
when causing the fuel cell not to perform power generation, the controller is programmed to control the stepping motor to place the valve element at the first position and close the pressure regulator, and
when causing the fuel cell to perform power generation, the controller is programmed to open the pressure regulator, control the stepping motor subsequently move the valve element by the first number of steps and additionally move the valve element toward the second position, based on the second number of steps.

3. The fuel cell system according to claim 1,
wherein when a request is given to move the valve element toward the first position during additional move of the valve element toward the second position, the controller is programmed to interrupt the additional move, store a position of interruption of the valve element where the additional move of the valve element is interrupted and a remaining number of steps, by which the valve element is not moved, out of the second number of steps, and subsequently control the stepping motor to move the valve element toward the first position, and
when the request is removed, the controller is programmed to control the stepping motor to move the valve element to the position of interruption and further move the valve element toward the second position by the remaining number of steps.

* * * * *